United States Patent [19]
Yip

[11] Patent Number: 5,996,483
[45] Date of Patent: Dec. 7, 1999

[54] PEELER

[76] Inventor: Chung Lun Yip, 3rd Floor, Blocks A & C, King Yip Factory Building, No. 59 King Yip Street, Kwun Tong, Kowloon, The Hong Kong Special Administrative Region of the People's Republic of China

[21] Appl. No.: 09/227,583

[22] Filed: Jan. 8, 1999

[51] Int. Cl.⁶ ..................................................... A23N 7/00
[52] U.S. Cl. ................................ 99/628; 99/540; 99/584; 99/623; 99/629; 99/634
[58] Field of Search .............................. 99/540, 541, 584, 99/623–634; 426/481–483; 241/92, 37.5, 101.2; 366/279, 244–254

[56] References Cited

U.S. PATENT DOCUMENTS

| | | | |
|---|---|---|---|
| 507,903 | 10/1893 | Hancock | 99/540 X |
| 1,194,318 | 8/1916 | Power | 99/623 X |
| 1,511,287 | 10/1924 | Lindley | 99/628 X |
| 1,619,550 | 3/1927 | Thebaud et al. | 99/623 |
| 2,347,383 | 4/1944 | Wiegratz | 99/634 X |
| 2,407,819 | 9/1946 | Dolan | 99/630 |
| 2,796,987 | 6/1957 | Meyer | 99/629 X |
| 3,123,114 | 3/1964 | Andrews et al. | 99/628 X |
| 3,990,358 | 11/1976 | Cade | 99/628 X |
| 4,442,764 | 4/1984 | Bos et al. | 99/633 |
| 4,768,429 | 9/1988 | Federighi | 99/631 |
| 5,307,738 | 5/1994 | Amstad | 99/625 |
| 5,617,783 | 4/1997 | Beeler | 99/631 |

*Primary Examiner*—Timothy Simone
*Attorney, Agent, or Firm*—Leydig, Voit & Mayer, Ltd.

[57] ABSTRACT

A peeler for garlic and/or peanuts includes a housing having an open top end and a cylindrical inner wall surface on which four ribs having respective surfaces are formed, and a lid for closing the housing top end. The peeler includes a central beater surrounded by the wall surface and supported for rotation about an axis. A handle is provided for rotating the beater so the garlic and/or peanut pieces strike the rib surfaces at a steep angle, whereby the skin of the garlic and/or peanut pieces is cracked open through continued movement by the beater for subsequent peeling.

12 Claims, 3 Drawing Sheets

PEELER

The present invention relates to a peeler for garlic and/or peanut.

SUMMARY OF THE INVENTION

According to the invention, there is provided a peeler for garlic and/or peanuts, which comprises a housing having an opening and provided with a cylindrical inner wall surface on which at least one rib having a surface is located, a lid for closing the opening of the housing, a beater surrounded centrally by the wall surface and supported for rotation about an axis, and driving means for rotating the beater to beat garlic and/or peanut pieces contained in the housing in order for the garlic and/or peanut pieces to strike the rib surface at a steep angle, whereby the skin of the garlic and/or peanut pieces is cracked open for subsequent peeling off through continued movement by the beater.

Preferably, the rib extends substantially parallel to the axis of rotation of the beater.

More preferably, the axis is substantially vertical, and the beater is rotatable in a clockwise direction when viewed from above, with the surface of the rib inclined in the opposite direction.

Further more preferably, the rib has a substantially triangular cross-section.

Conveniently, the wall surface is provided by a cylindrical collar which is separate from the housing but for use inside.

In a preferred embodiment, the wall surface is formed with four of the ribs which are substantially equi-angularly spaced.

According to a specific construction, the beater has a shaft and at least one blade extending radially from the shaft, the blade having a surface in the direction of rotation for beating the garlic and/or peanut pieces.

More specifically, the surface of the blade is convex when viewed in a direction parallel to the axis of rotation of the beater.

It is preferred that the blade extends to reach slightly short of the rib.

In a preferred embodiment, the beater has two of the blades extending from the shaft in opposite directions.

Preferably, the driving means comprises a rotatable handle provided on the lid.

More preferably, the driving means includes a gear train located inside the lid and between the handle and the beater for transmitting rotation of the handle to the beater at a relatively higher speed.

BRIEF DESCRIPTION OF DRAWINGS

The invention will now be more particularly described, by way of example only, with reference to the accompanying drawings, in which.

DETAILED DESCRIPTION OF THE PREFERRED EMBODIMENT

Figure 1:
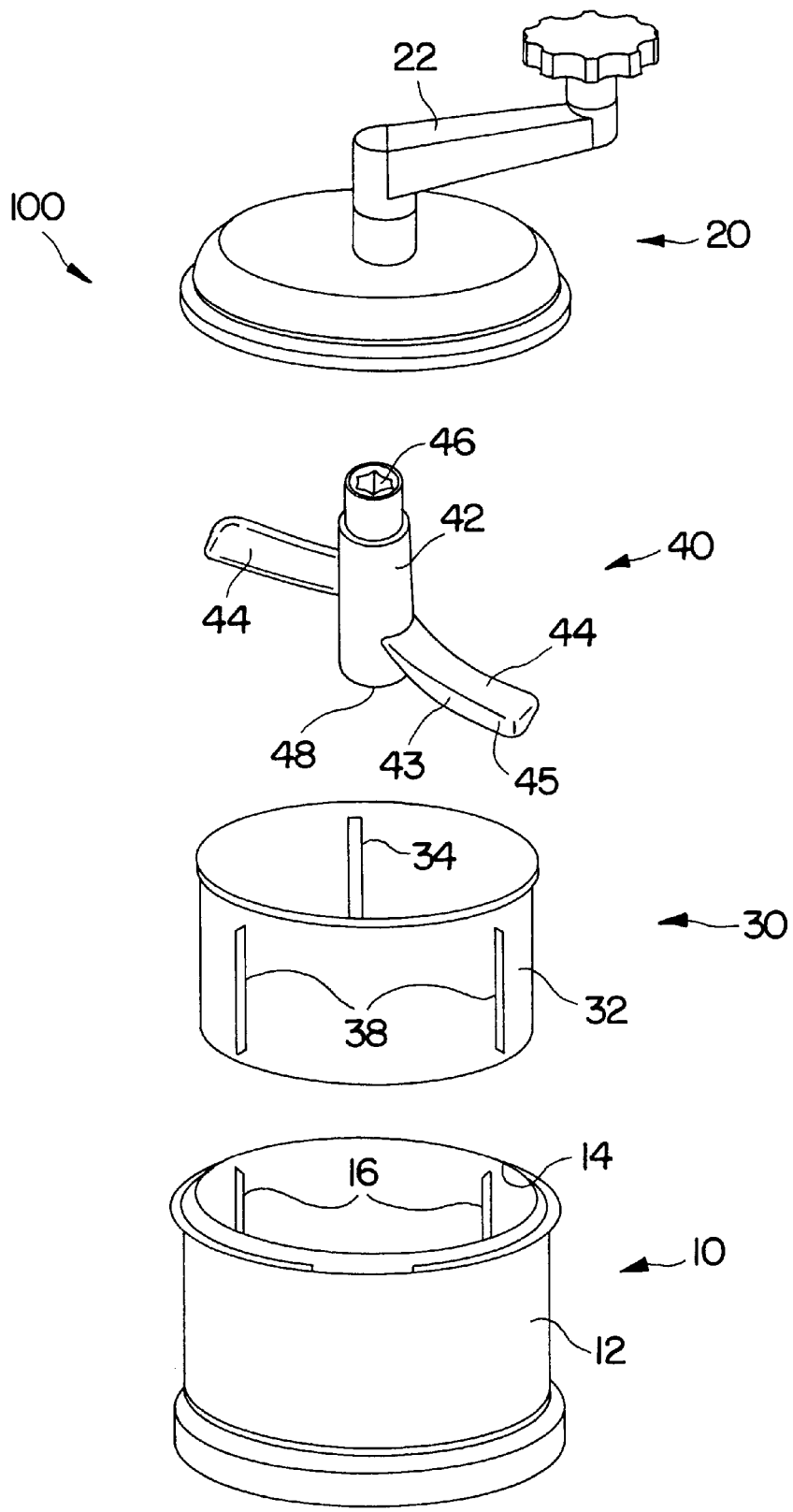
FIG. 1 is an exploded perspective view of an embodiment of a peeler in accordance with the invention, the peeler including a cylindrical collar and a rotary beater.
Figure 2:
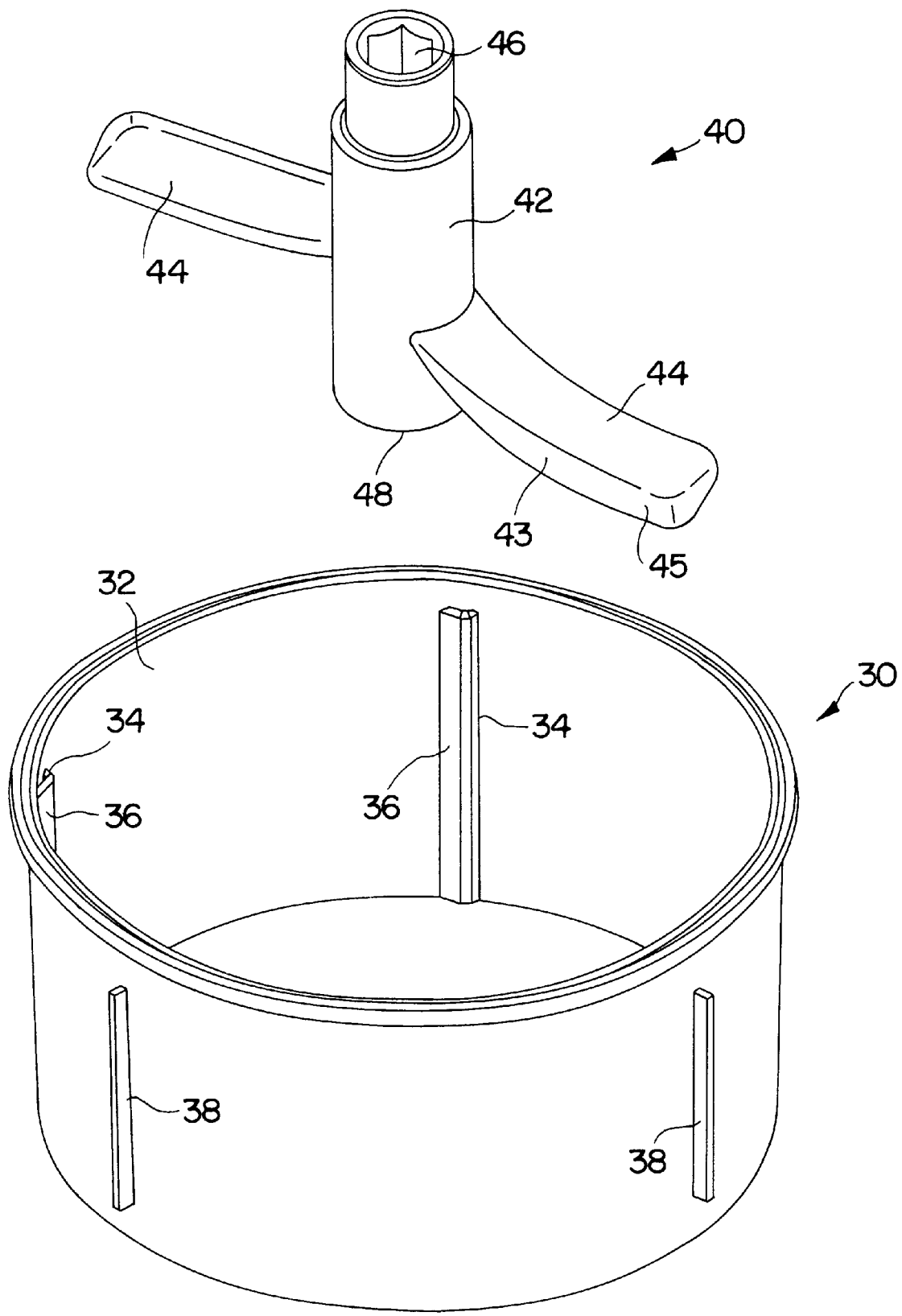
FIG. 2 is an enlarged perspective view of the collar and beater of FIG. 1.
Figure 3:
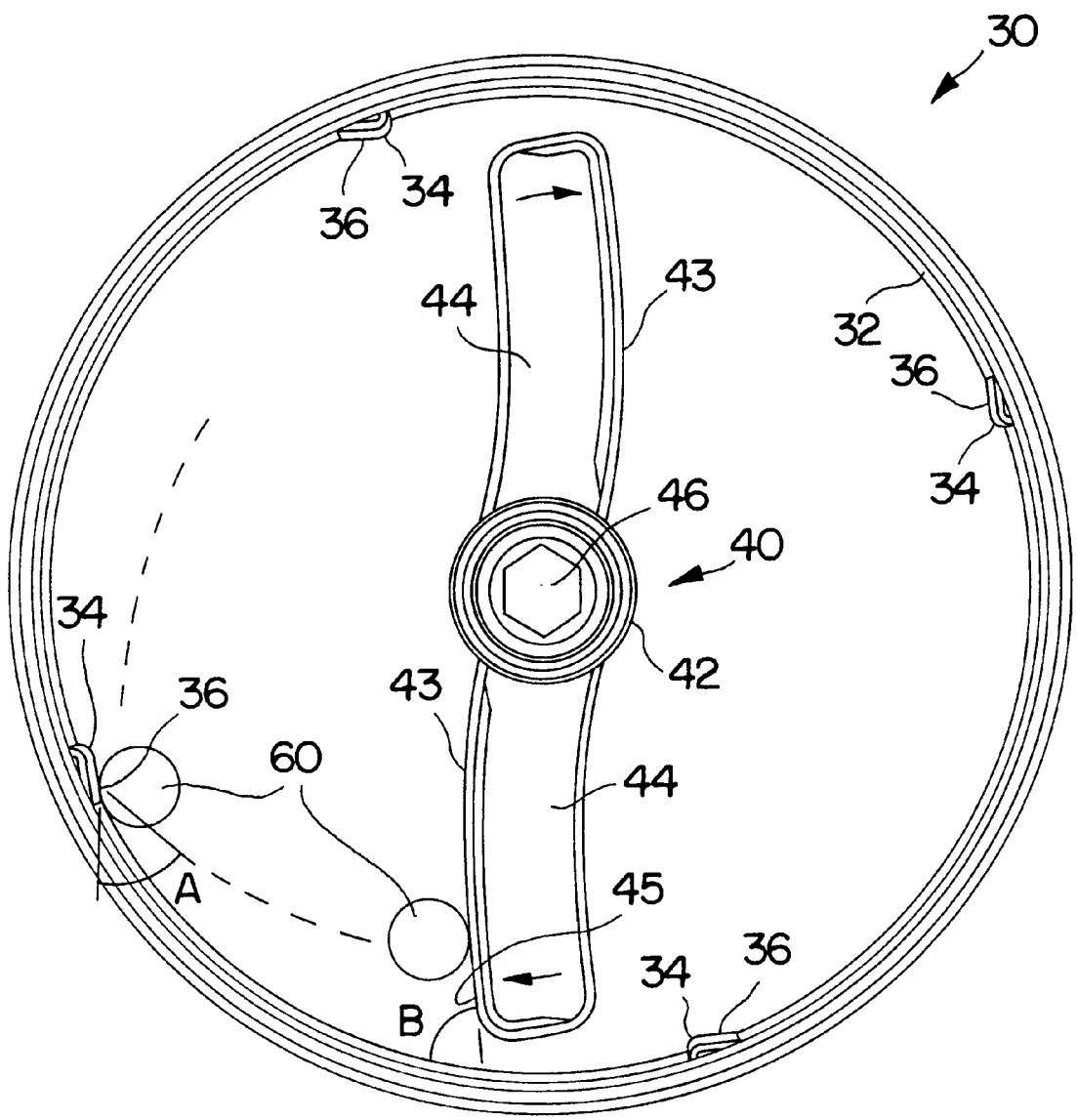
FIG. 3 is a top plan view of the collar and beater of FIG. 1, in operation for peeling off the skin of a piece of garlic and/or peanut.

Referring to the drawings, there is shown a garlic and/or peanut peeler 100 embodying the invention, which peeler 100 comprises a cylindrical plastic housing 10 having a peripheral wall 12 and an open top end 14 and includes a circular plastics lid 20, incorporating a top cranked handle 22, for closing the housing 10. The housing 10 includes a short central stud (not shown) upstanding from the bottom wall. The lid 20 is provided with a short hexagonal driving shaft (not shown) depending from the centre of the lower side and contains a gear train provided between the handle 22 and the driving shaft for transmitting clockwise rotation of the handle 22 to the driving shaft at a relatively much higher speed.

The peeler 100 includes a plastics collar 30 and a plastic beater 40. The collar 30 fits loosely inside the housing 10, and has a cylindrical wall 32 and four vertical ribs 34 formed integrally and egui-angularly on the inner surface of the wall 32. Each rib 34 extends from the bottom of the wall 32 to almost the top of the wall 32, and has a cross-section which is generally triangular to provide a elongate flat surface 36 inclined in an anti-clockwise direction. Although the collar 30 is rotatable inside the housing 10, its rotation is limited in extent and will soon be stopped by abutment between external ribs 38 of the collar 30 and internal ribs 16 of the housing 10 such that, in operation, the collar 30 is stationary.

The beater 40 has a hollow shaft 42 and includes a pair of integral blades 44, at different levels, extending radially from the shaft 42 in diametrically opposite directions. Each blade 42 is slightly curved and includes a relatively thicker side providing a beating surface 43 in the direction of rotation of the beater 40. The surfaces 43 are slightly convex when viewed from above, such that their free ends 45 are inclined with the inner surface of the collar wall 32 at an angle B which is less than 90°.

The beater 40 is to be used centrally inside the housing 10 and surrounded centrally by the collar 30. The upper end of the shaft 42 is formed with a hexagonal hole 46 for coupling with the driving shaft of the lid 20, and its the lower end includes a round hole 48 for rotatably engaging the bottom stud of the housing 10. While the beater 40 is in place, its blades 44 extend to reach slightly short of the ribs 34 of the collar 30.

In operation, garlic pieces 60 are put inside the housing 10 and hence the collar 30, around the beater 40. Upon clockwise rotation (at a sufficiently high speed), the blades 44 will hit or beat, by means of their beating surfaces 43, the garlic pieces 60 and propel them towards the wall 32. Some of those garlic pieces 60 near the wall 32 will strike the rib surfaces 36 at a steep angle A, nearly at a right angle. As a result of such bombardment and/or subsequently repeated bombardments, the skin of said garlic pieces 60 will be cracked open.

Continued beating of the garlic pieces 60 by the beater 40 and continued rubbing/hitting of the garlic pieces 60 with one another and hitting against the ribs 34 (movement caused by beater 40) will eventually cause the cracked open garlic skin to come off. When most, if not all, of the garlic skin has come off, the garlic pieces 60 without skin can easily be separated for use.

The peeler 100 may be used to remove the skin of peanuts, particularly after the peanuts have been soaked in water.

It has been found that the design of the beater 40 is not critical, though the described construction is preferred. Alternatively, the peeler of this invention may be driven by an electric motor.

The invention has been given by way of example only, and various other modifications of and/or alterations to the described embodiment may be made by persons skilled in the art without departing from the scope of the invention as specified in the appended claims.

What is claimed is:

1. A peeler for garlic and/or peanuts comprising a housing having an opening and a cylindrical inner wall surface on which at least one rib having a surface is located, a lid for closing the opening of the housing, a centrally located beater surrounded by the inner wall surface and supported for rotation about an axis, and driving means for rotating the beater so that garlic and/or peanut pieces in the housing strike the rib surface at a steep angle, whereby skin of the garlic and/or peanut pieces is cracked open through continued movement by the beater for subsequent peeling.

2. The peeler as claimed in claim 1, wherein the rib extends substantially parallel to the axis of rotation of the beater.

3. The peeler as claimed in claim 2, wherein the axis is substantially vertical, and the beater is rotatable in a clockwise direction when viewed from above, with the surface of the rib inclined in the opposite direction.

4. The peeler as claimed in claim 3, wherein the rib has a substantially triangular cross-section.

5. The peeler as claimed in claim 1, wherein the wall surface is provided by a cylindrical collar separate from the housing.

6. The peeler as claimed in claim 1, wherein the wall has four of the ribs substantially equi-angularly spaced.

7. The peeler as claimed in claim 1, wherein the beater has a shaft and at least one blade extending radially from the shaft, the blade having a surface in the direction of rotation of the beater.

8. The peeler as claimed in claim 7, wherein the surface of the blade is convex when viewed in a direction parallel to the axis of the beater.

9. The peeler as claimed in claim 6, wherein the blade extends slightly short of the rib.

10. The peeler as claimed in claim 6, wherein the beater has two blades extending from the shaft in opposite directions.

11. The peeler as claimed in claim 1, wherein the driving means comprises a rotatable handle provided on the lid.

12. The peeler as claimed in claim 11, wherein the driving means includes a gear train located inside the lid and between the handle and the beater for rotating the beater at a higher speed than the handle.

* * * * *